(12) United States Patent
Walls et al.

(10) Patent No.: US 7,430,623 B2
(45) Date of Patent: Sep. 30, 2008

(54) SYSTEM AND METHOD FOR BUFFERING DATA RECEIVED FROM A NETWORK

(75) Inventors: Jeffrey Joel Walls, Fort Collins, CO (US); Michael T Hamilton, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 304 days.

(21) Appl. No.: 10/361,742

(22) Filed: Feb. 8, 2003

(65) Prior Publication Data

US 2004/0156379 A1 Aug. 12, 2004

(51) Int. Cl.
- G06F 3/00 (2006.01)
- G06F 15/16 (2006.01)
- H04L 12/28 (2006.01)
- H04L 12/56 (2006.01)

(52) U.S. Cl. .............. 710/52; 710/53; 710/56; 709/250; 370/412

(58) Field of Classification Search .......... 710/52, 710/56, 53, 46, 36, 57; 709/250, 232; 370/412, 370/235
See application file for complete search history.

(56) References Cited

U.S. PATENT DOCUMENTS

| | | | |
|---|---|---|---|
| 4,475,192 A | | 10/1984 | Fernow et al. |
| 4,933,932 A | | 6/1990 | Quinquis et al. |
| 5,016,248 A | | 5/1991 | Kudoh |
| 5,291,482 A | * | 3/1994 | McHarg et al. ............ 370/413 |
| 5,303,302 A | | 4/1994 | Burrows |
| 5,396,490 A | * | 3/1995 | White et al. ................ 370/474 |
| 5,610,914 A | | 3/1997 | Yamada |
| 5,701,427 A | | 12/1997 | Lathrop |
| 5,732,082 A | * | 3/1998 | Wartski et al. ........... 370/395.6 |
| 5,802,058 A | | 9/1998 | Harris et al. |
| 6,128,295 A | | 10/2000 | Larsson et al. |
| 6,212,165 B1 | * | 4/2001 | Mann et al. ................. 370/231 |
| 6,266,701 B1 | | 7/2001 | Sridhar et al. |
| 6,400,695 B1 | | 6/2002 | Chuah et al. |
| 6,445,717 B1 | | 9/2002 | Gibson et al. |
| 6,539,431 B1 | | 3/2003 | Sitaraman et al. |

OTHER PUBLICATIONS

Adamson, et al.,NACK-Oriented Reliable Multicast (NORM) Protocol Building Blocks, Proceedings of the Fourty-Ninth Internet Engineering Task Force (Jul. 2000) <http://www.ietf.org/proceedings/00dec/I-D/draft-ietf-rmt-morm-bb-00.txt.
Adamson, et al.,NACK-Oriented Reliable Multicast Protocol (NORM), Proceedings of the Fourty-Ninth Internet Engineering Task Force (Nov. 2000) <http://www.ietf.org/proceedings/00dec/I-D/draft-ietf-rmt-morm-00.txt.
Walls, et al.,Apparatus and Method for Communicating With a Network, U.S. Appl. No. 10/361,231, filed Feb. 8, 2003.

* cited by examiner

Primary Examiner—Tanh Q Nguyen (57) ABSTRACT

A system for buffering data received from a network comprises a network socket, a plurality of buffers, a buffer pointer pool, receive logic, and packet delivery logic. The buffer pointer pool has a plurality of entries respectively pointing to the buffers. The receive logic is configured to pull an entry from the pool and to perform a bulk read of the network socket. The entry points to one of the buffers, and the receive logic is further configured to store data from the bulk read to the one buffer based on the entry. The packet delivery logic is configured to read, based on the entry, the one buffer and to locate a missing packet sequence in response to a determination, by the packet delivery logic, that the one buffer is storing an incomplete packet sequence. The packet delivery logic is further configured to form a complete packet sequence based on the incomplete packet sequence and the missing packet sequence.

9 Claims, 6 Drawing Sheets

SYSTEM AND METHOD FOR BUFFERING DATA RECEIVED FROM A NETWORK

RELATED ART

In some communication systems, such as networked graphical rendering systems, for example, large amounts of data are transmitted from a transmitting unit through a network to at least one-receiving unit. For example, a graphics application at a transmitting unit may transmit graphical data to at least one remote receiving unit that renders the graphical data to form a rendered image. In such a system, communication of large amounts of graphical data at a relatively high transmission rate may be needed in order to provide a suitable frame rate for the rendered image.

Performance of a system's transmitting and receiving units in transmitting data to and receiving data from a network is typically an important factor in whether graphical data can be successfully rendered via a remote receiving unit at suitable frame rates. Unfortunately, achieving a suitable transmission rate for the data communicated from the transmitting unit to the receiving unit or units can sometimes be problematic, particularly in instances where a large number of receiving units are to receive the graphical data. In such situations, the transmitting unit may be configured to transmit each graphics command multiple times through the network (e.g., once for each destination receiving unit that is to receive the command). The multiple transmissions of the graphics commands can significantly increase the amount of data that is to be communicated through the network.

SUMMARY OF THE INVENTION

Thus, better techniques for communicating with a network to achieve a higher network throughput are generally desirable. Generally, embodiments of the present invention provide a system and method for buffering data received from a network.

An exemplary system in accordance with one embodiment of the present invention comprises a network socket and receive logic. The receive logic is configured to perform a bulk read of the network socket and to store data from the bulk read into one of a plurality of buffers. The receive logic is further configured to perform a scan of the one buffer and to detect, based on the scan, a partial packet stored in the one buffer. The receive logic is further configured to write the partial packet to a second one of the buffers in response to a detection of the partial packet.

Another exemplary system in accordance with another embodiment of the present invention comprises a network socket, a plurality of buffers, a buffer pointer pool, receive logic, and packet delivery logic. The buffer pointer pool has a plurality of entries respectively pointing to the buffers. The receive logic is configured to pull an entry from the pool and to perform a bulk read of the network socket. The entry points to one of the buffers, and the receive logic is further configured to store data from the bulk read to the one buffer based on the entry. The packet delivery logic is configured to read, based on the entry, the one buffer and to locate a missing packet sequence in response to a determination, by the packet delivery logic, that the one buffer is storing an incomplete packet sequence. The packet delivery logic is further configured to form a complete packet sequence based on the incomplete packet sequence and the missing packet sequence.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION

Figure 1:
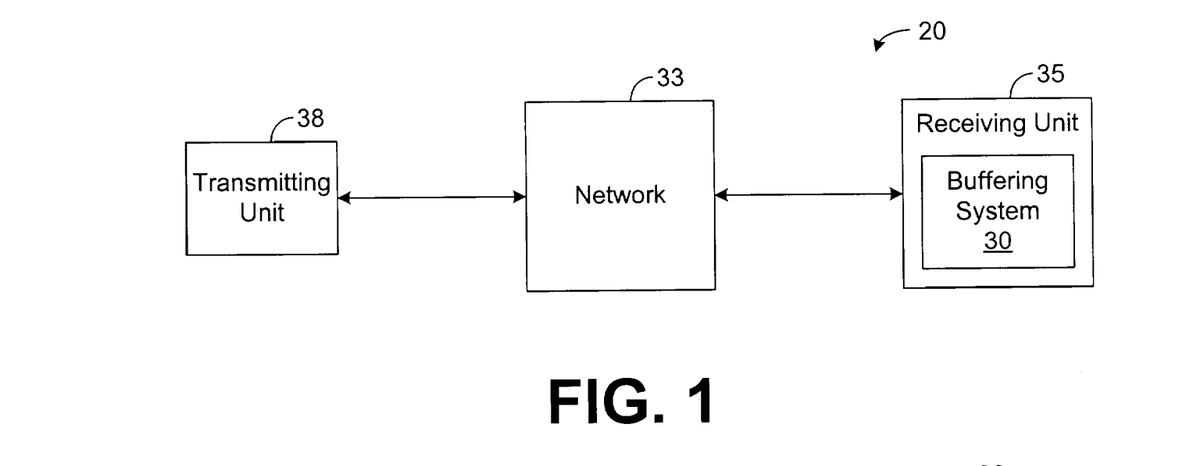
FIG. 1 is a block diagram illustrating an exemplary communication system in accordance with the present invention.

The present invention generally pertains to a system and method for efficiently buffering data packets. Indeed, FIG. 1 depicts a communication system 20 that employs a buffering system 30 in accordance with an exemplary embodiment of the present invention in order to buffer data packets that are received from a network 33. As shown by FIG. 1, the buffering system 30 resides within a receiving unit 35 that is communicatively coupled to the network 33, and a transmitting unit 38 is configured to transmit at least one sequence of data packets through the network 33 to the receiving unit 35. The buffering system 30 is then configured to temporarily buffer the received data packets before various processing is performed on the data packets by the receiving unit 35 or by various components (not specifically shown) further downstream of the receiving unit 35.

For illustrative purposes, the system 20 will be described hereafter as communicating graphical data from the transmitting unit 38 to the receiving unit 35 for rendering of the graphical data at the receiving unit 35. However, it should be emphasized that other types of data may be communicated by the system 20 and buffered by the buffering system 30 in other embodiments.

Figure 2:
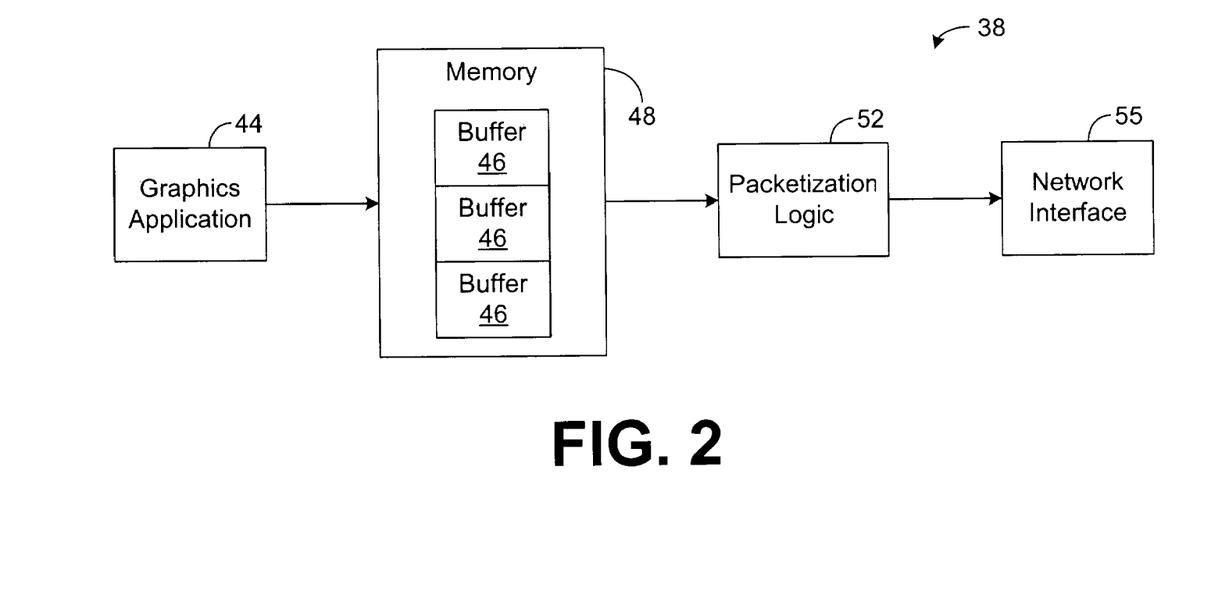
FIG. 2 is a block diagram illustrating an exemplary transmitting unit, such as is depicted in FIG. 1.

As shown by FIG. 2, the transmitting unit 38 comprises a graphics application 44 that is configured to produce graphical that is to be communicated to the receiving unit 35 of FIG. 1. During operation, the graphics application 44 stores sets of graphical data in different blocks 46 of memory 48, referred to hereafter as "buffers 46." As an example, the graphics application 44 may produce several image frames and store each of the image frames within a different buffer 46.

Packetization logic 52 retrieves graphical data from the buffers 46 and packetizes the retrieved data into data packets. The packetization logic 52 then communicates the data packets to a network interface 55, which interfaces the data packets with the network 33 such that the data packets are transmitted to the receiving unit 35.

Figure 3:
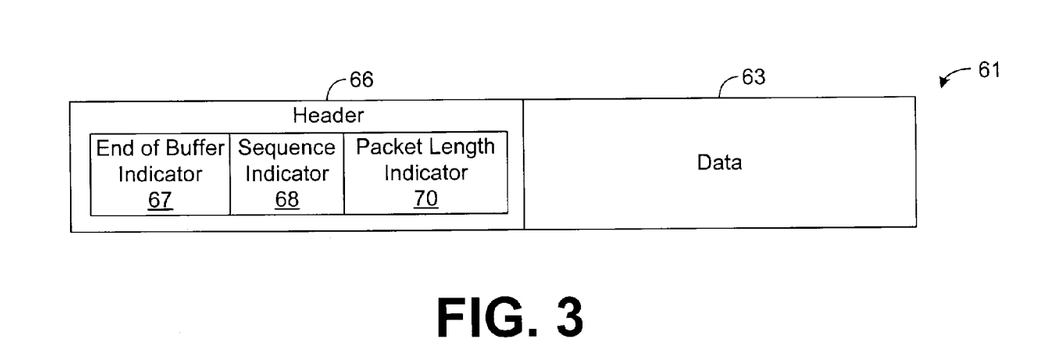
FIG. 3 is a block diagram illustrating an exemplary data packet that may be transmitted from a transmitting unit, such as is depicted in FIG. 2.

As shown by FIG. 3, each of the transmitted data packets 61 preferably comprises a data portion 63 and a header 66. When packetizing the graphical data retrieved from the buffers 46, the packetization logic 52 inserts a portion of the retrieved data in the data portion 63 and inserts various control information within the header 66 for enabling the packet to be communicated through the network 33 to the receiving unit 35. In the exemplary embodiment depicted by FIG. 3, the packetization logic 52 inserts, into the header, an end of buffer indicator 67, a sequence indicator 68, and a packet length indicator 70.

The end of buffer indicator 67 preferably comprises a pointer, which the packetization logic 52 preferably initializes to a particular value, such as a null value, for example. Utilization of such a pointer will be described in more detail hereafter.

To uniquely identify each packet 61, the packetization logic 52 assigns each packet 61 a sequence indicator 68 that indicates the packet's position within a sequence of packets transmitted from the transmitting unit 38. In an exemplary embodiment, the packetization logic 52 assigns each packet 61 a sequence indictor 68 that is incremented with respect to the preceding packet 61 packetized by the packetization logic 52. Further, the transmitting unit 38, except when retransmitting a packet 61 in response to a retransmission request, as will be described in more detail hereinbelow, generally transmits packets 61 in the same order that such packets 61 were packetized. Thus, in general, the difference between the sequence indicators 68 of two packets 61 consecutively transmitted by the transmitting unit 38 is one (1), unless one of the data packets is a retransmission in response to a retransmission request.

Each data packet 61 also comprises a packet length indicator 70 indicative of the packet's length. For example, the packet length indicator 70 may comprise a value corresponding to the number of bytes defining the packet 61. As an example, if the packet 61 is fifty (50) bytes long, the packet length indicator 70 of the packet 61 may be fifty (50).

Figure 4:
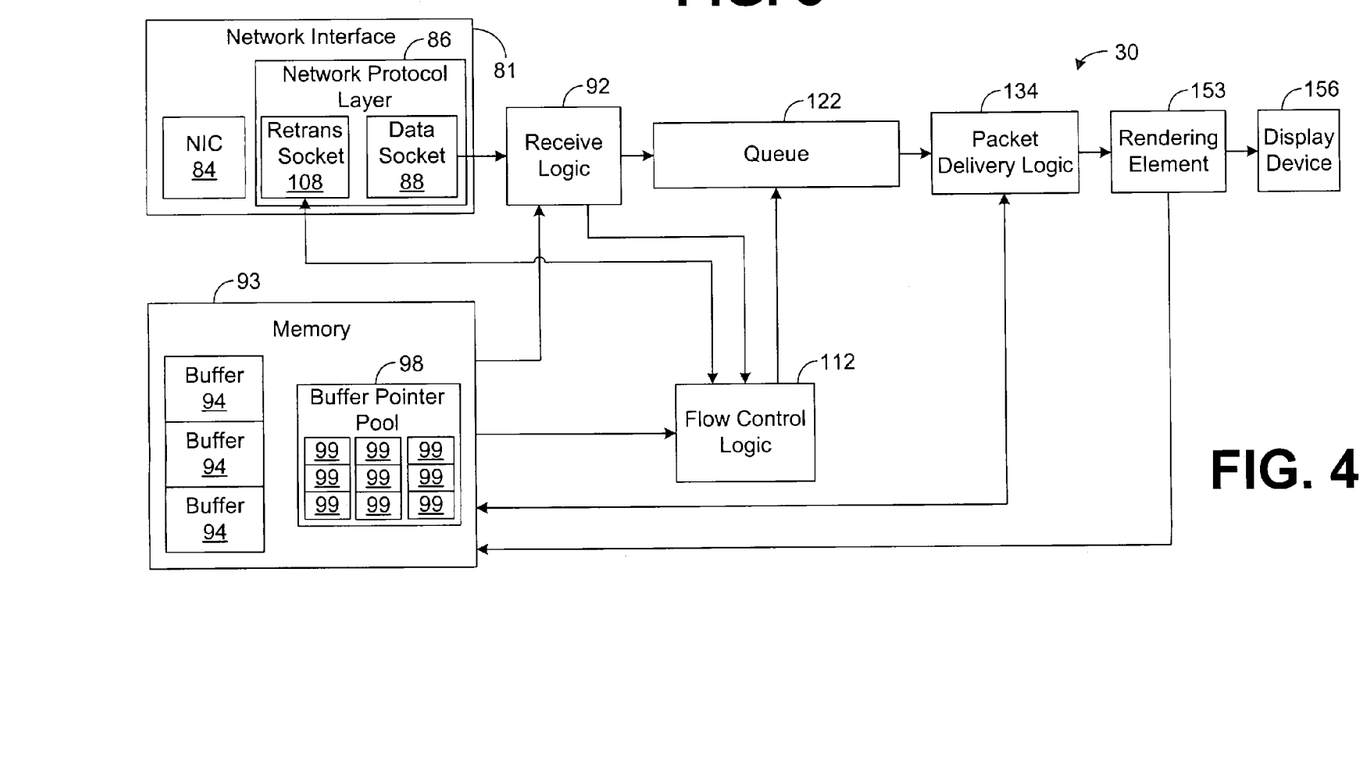
FIG. 4 is a block diagram illustrating an exemplary buffering system, such as is depicted in FIG. 1.

As shown by FIG. 4, the buffering system 30 of the receiving unit 35 comprises a network interface 81 for receiving, from the network 33 (FIG. 1), the packets transmitted from the transmitting unit 38. In one exemplary embodiment, the network interface 81 has a network interface card (NIC) 84 comprising hardware components for establishing at least one physical connection with the network 33. The network interface 81 also comprises a network protocol layer 86, which may be implemented in hardware, software, or any combination thereof. Data received from the network 33 may be read from a data socket 88 of the network protocol layer 86, and data to be transmitted to the network 33 by the receiving unit 35 may be written to the socket 88. As shown by FIG. 4, the network protocol layer 86 also preferably comprises a second socket 89, referred to as a "retransmission socket 89," for handling the retransmissions of missing packets, as will be described in more detail hereinafter.

Receive logic 92 within the buffering system 30 periodically performs a bulk read of data from the socket 88 and stores the data from this bulk read into one of a plurality of blocks 94 of memory 93, referred to hereafter as a "buffers 94." Each buffer 94 is preferably pre-allocated and sized such that the buffer 94 may store a large number (e.g., several hundred) of data packets. Furthermore, the buffering system 30 also comprises a buffer pointer pool 98, which stores a plurality of buffer pointer entries 99 that respectively point to the buffers 94.

Figure 5:
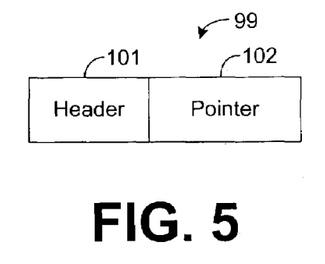
FIG. 5 is a block diagram illustrating an exemplary buffer pointer entry, such as is depicted in FIG. 4.

In this regard, as shown by FIG. 5, each pointer entry 99 in the buffer pointer pool 98 preferably has a header 101 and a pointer 102 that points to an available one of the buffers 94 (i.e., one of the buffers 94 that may be written to without corrupting data in the buffer 94). Initially, all of the buffers 94 are available, and the buffer pointer pool 98 comprises a pointer entry 99 for each of the buffers 94. However, when a buffer 94 is written to, as will be described in more detail hereinbelow, the pointer entry 99 associated with (i.e., pointing to) this buffer 94 is pulled from the pool 98 and is not returned to the pool 98 until the buffer 94 is again available. Thus, the entries 99 of the buffer pointer pool 98 may be analyzed to determine which of the buffers 94 may be written to without corrupting valid data.

Note that it is not necessary for the buffers 94 to be pre-allocated. In this regard, it is possible for the receive logic 92 to dynamically allocate a buffer 94 and an associated pointer entry 99 as packets are received. However, the allocation of buffers 94 and buffer pointer entries 99 consumes time and processing resources potentially slowing the rate at which the receive logic 92 can process data packets. Furthermore, slowing the packet processing rate of the receive logic 92 can increase the number of lost data packets thereby resulting in a higher number of retransmission requests that can significantly degrade the performance of the communication system 20. Thus, pre-allocating buffers 94 and buffer pointer entries 99 helps to improve the performance of the receive logic 92 and of the system 20 as a whole.

When the receive logic 92 is ready to perform a bulk read of the socket 88, the receive logic 92 pulls a pointer entry 99 from the buffer pointer pool 98. The receive logic 92 then performs a bulk read of the socket 88 while writing the data read from the socket 88 into the buffer 94 pointed to by the pointer 102 of the pulled entry 99. Note that, during this bulk read, a large number (e.g., several hundred) of data packets may be written to the foregoing buffer 94.

Furthermore, to reduce the time it takes for the receive logic 92 to read data from of the socket 88, it is desirable for the receive logic 92 to perform the bulk read without performing multiple passes of the data on the socket 88. However, without performing multiple passes of such data, the receive logic 92 may not be aware of when it has reached the end of the last packet that is to be stored to the foregoing buffer 94. Therefore, it is possible for the data at the end of the buffer 94 (i.e., the last data stored to the buffer 94) to define a partial data packet. Exemplary techniques for accommodating partial packets will be described in more detail hereafter.

After performing the bulk read, the receive logic 92 scans the data stored in the buffer 94 in order to identify each packet within the buffer 94. In this regard, the receive logic 92 locates the first packet written to the buffer 94 based on the pointer 102 of the pulled entry 99. The receive logic 92 then locates and reads the packet length indicator 70 (FIG. 3) of the first packet. Based on the starting address of the first packet and the packet length indicator 70 of the first packet, the receive logic 92 can determine the memory address where the next sequential packet (i.e., the second packet) is stored. The receive logic 92 may scan through the buffer 94 via similar techniques for each packet within the buffer 94 in order to identify each of the packets stored therein.

While the receive logic 92 is identifying the data packets via a scan of the buffer 94, the receive logic 92 preferably reads the sequence indicator 68 of each packet and provides this information to flow control logic 112, which will be described in more detail hereinbelow. The receive logic 92 also identifies the last complete packet stored in the buffer 94. Note that a packet is referred to as "complete" if all of the bytes of the packet are stored in the buffer 94. Thus, if the number of bytes of the last packet is below the number indicated by the packet's length indicator 70, then the last packet is a partial packet and is, therefore, not the last complete packet. In such an example, the last complete packet is actually the preceding packet or, in other words, the penultimate packet stored in the buffer. However, if the number of bytes of the last packet is equal to the number indicated by the packet's length indicator 70, then the last packet in the buffer 94 is indeed the last complete packet;

After identifying the last complete packet, the receive logic 92 adjusts this packet's end of buffer indicator 67 (FIG. 3) in order to mark this packet as the last complete packet of the buffer 94. In one exemplary embodiment, the receive logic 92 adjusts the foregoing indicator 67 such that it points to the starting address of the buffer 94 (e.g., the first packet stored in the buffer 94). Thus, all of the packets stored in the buffer 94 have an indicator 67 initialized to a null value except the last complete packet, which has an indicator 67 pointing to the start of the buffer 94. Utilization of the adjusted indicator 67 of the last complete packet will be described in more detail hereinbelow.

If the last packet of the buffer 94 is a partial packet and, therefore, not the last complete packet of the buffer 94, then the receive logic 92 preferably copies the data of this partial packet to the next buffer 94 to be written into upon the performance of the next bulk read of the socket 88. Thus, the receive logic 92 pulls another entry 99 from the buffer pointer pool 98 and writes the partial packet at the first or starting memory address of the buffer 94 pointed to by this entry 99. Then, the receive logic 92 initiates another bulk read of the socket 88 while writing the data read from the socket 88 to the foregoing buffer 94, and the receive logic 92 repeats the process described above for this buffer 94. In other words, the receive logic 92 scans the buffer 94 and identifies the packets stored therein. Then, the receive logic 92 adjusts the end of buffer indicator 67 of the last complete packet and moves the last packet to another buffer 94, if the last packet is a partial packet.

Based on the sequence indicators 68 provided to it by the receive logic 92, the flow control logic 112 may determine whether there are any packets missing from the sequence of packets being read by the current bulk read of the socket 88. In this regard, in the example described above, the sequence indicator 68 of each data packet transmitted by the transmitting unit 38 is incremented relative to the sequence indicator 68 of the preceding data packet. In such an example, the flow control logic 112 may detect a missing data packet by determining when the sequence indicators 68 of two consecutive data packets processed by the receive logic 92 are not consecutive.

For example, if a set of three consecutively received data packets have sequence indicators 68 corresponding to the values of "10," "11," and "12," then the flow control logic 112 determines that there are no missing data packets between the first and last packets of the set. In particular, the sequence indicator 68 of each consecutive data packet is incremented relative to the sequence indicator 68 of the preceding packet received before it. However, if the set of sequence indicators 161 instead corresponds to the values of "10," "101", and "102," then the flow control logic 112 preferably detects that a sequence of ninety (90) packets having indicators 68 from eleven (11) to one-hundred (100) is missing.

When the flow control logic 112 detects a sequence of missing data packets, the logic 112 generates a retransmission request that requests the retransmission of the missing sequence. This retransmission request is transmitted over the network 33 to the transmitting unit 38, which retransmits the sequence of missing data packets in response to the retransmission request. The retransmitted sequence of missing data packets is received by the receiving unit 35 and stored into a buffer 94 of the receiving unit 35. Utilization of the foregoing missing packet sequence will be described in more detail hereinbelow.

Once the receive logic 92 has completed a bulk read of the socket 88 and has stored the data from the bulk read into a buffer 94, as described above, the receive logic 92 inserts, into a queue 122 the aforedescribed pulled entry 99 that points to the foregoing buffer 94. The receiving unit 35, for each bulk read of the socket 88 performed by the receive logic 92, repeats the aforedescribed process of pulling an entry 99 from the pool 98 and then inserting the pulled entry 99 into the queue 122 after writing data from the bulk read to the buffer 94 identified by the pulled entry 99. Thus, the queue 122 may comprise several entries 99 that point to buffers 94 storing data packets read from the socket 88.

Packet delivery logic 134 is preferably configured to sequentially pull the aforedescribed entries 99 from the queue 122. For each entry 99 pulled from the queue 122, the packet delivery logic 134 analyzes the data packets within the buffer 94 pointed to by the entry 99 and determines whether this buffer 94 has a complete sequence of data packets stored therein. Note that a buffer 94 has such a complete sequence of data packets when each packet of the sequence was successfully received by the receiving unit 35 and stored in the buffer 94.

When the packet delivery logic 134 determines that the buffer 94 identified by the pulled entry 99 is storing an incomplete packet sequence, the packet delivery logic 134 is configured to construct a complete packet sequence comprising the packets of the incomplete packet sequence as well as the data packets missing from this incomplete packets sequence. Various techniques for achieving the foregoing may be performed by the packet delivery logic 134. Exemplary techniques for constructing a complete packet sequence will now be described in more detail below.

In this regard, as described above, the flow control logic 112 preferably requests retransmission of missing data packets when such missing data packets are detected by the logic 112. In response, the transmitting unit 38 retransmits the requested packets to the retransmission socket 89. The flow control logic 112 preferably monitors this socket 89 and stores each complete sequence received by this socket 89 to one of the buffers 94. In this regard, when a retransmitted packet sequence received by the socket 89, the flow control logic 112 pulls an entry 99 from the buffer pointer pool 98. The logic 112 then reads the retransmitted packet sequence from the socket 89 and stores this sequence in the buffer 94 identified by the pulled entry 99. The flow control logic 112 then stores information indicative of the retransmitted sequence (e.g., information indicative of the range of sequence indicators 68 of the packets in the retransmitted sequence) in the header 101 of the pulled entry 99 and inserts the pulled entry 99 into the queue 122. This entry 99 later will be used by the packet delivery logic 134 to construct a complete packet sequence from the aforementioned incomplete packet sequence.

More specifically, in constructing such a complete packet sequence, the packet delivery logic 134 may pull an entry 99 from the buffer pointer pool 98 and copy, into the buffer 94 identified by this entry 99, referred to hereafter as the "new buffer 94," each packet of the incomplete packet sequence. Further, the packet delivery logic 134 may search the queue 122 for the entry 99 having a header 101 (FIG. 5) identifying the missing packet sequence. Note that, according to the techniques described above, the flow control logic 112 requests retransmission of the missing packet sequence and inserts the foregoing entry 99 when the logic 112 receives the retransmission of the missing packet sequence. When the packet delivery logic 134 locates the entry 99 having a header 101 identifying the missing packet sequence, the logic 134 may pull this entry 99 from the queue 122 and then retrieve the missing packet sequence from the buffer 94 identified by the pulled entry 99. The packet delivery logic 134 may then insert the missing packet sequence into its proper place (i.e., within the hole of the incomplete packet sequence) within the new buffer 94. Thus, a complete packet sequence is constructed within the new buffer 94.

After constructing a complete packet sequence based on an incomplete packet sequence and a missing packet sequence, as described above, the packet delivery logic 134 preferably writes the entries 99 identifying the buffers 94 used to store the incomplete and missing packet sequences into the buffer pointer pool 98. In this regard, as described above, the end of buffer indicator 67 of the last complete packet is preferably set, by the receive logic 92, to point to the starting address of the buffer 94 in which the last complete packet is stored. For each of the foregoing buffers 94, the packet delivery logic 134 may write, to the buffer pointer pool 98, an entry 99 pointing to the same address as the indicator 67 of the buffer's last complete data packet (i.e., pointing to the starting address of the buffer 94). Such an action has the effect of freeing the foregoing buffers 94.

Figure 6:
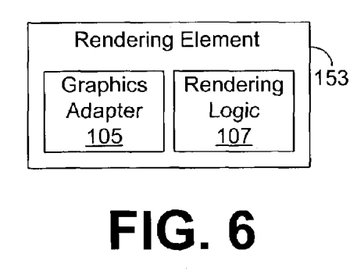
FIG. 6 is a block diagram illustrating an exemplary rendering element, such as is depicted in FIG. 4.

Further, after constructing a complete packet sequence, as described above, the packet delivery logic 134 preferably transmits, to the rendering element 153, the entry 99 pointing to the new buffer 94. In response, the rendering element 153 retrieves the complete packet sequence stored in the new buffer 94 and renders the graphical data of this sequence. In this regard, as shown by FIG. 6, the rendering element 153 preferably comprises a graphics adapter 105 and rendering logic 107. The rendering logic 107 may be configured to drive the graphical data through the graphics adapter 105, which accelerates and renders the graphical data to the display device 156 (FIG. 4) via known or future-developed techniques. Note that after graphical data from the new buffer 94 is retrieved, the rendering element 153 preferably writes, to the buffer pointer pool 98, an entry 99 pointing to the new buffer 94 thereby freeing the new buffer 94 for reuse by the receive logic 92. Similar to the packet delivery logic 134, the rendering element 153 may utilize the end of buffer indicator 67 of the last complete data packet in the new buffer 94 to define the pointer 102 (FIG. 5) of the entry 99 writing to the pool 98 by the rendering element 153.

Note that when the flow control logic 112 receives a retransmission of missing data packets, the flow control logic 112 preferably stores the data of the retransmission into a buffer 94 to the exclusion of other packets that are not part of the missing sequence. Thus, the foregoing buffer 94 stores only the missing packet sequence. Such a feature helps to facilitate construction of a complete packet sequence based on the missing packet sequence and facilitates the configuration of the packet delivery logic 134. In this regard, storing a missing packet sequence into a buffer 94 to the exclusion of other packets keeps the retransmitted missing data packets separate from other data packets that may not be inserted into the same buffer 94 that is being used to construct the complete packet sequence.

In addition, it should be noted that different protocols may be used to communicate retransmissions as compared to original transmissions of data packets. For example, the transmitting unit 38 may be configured to communicate original transmissions via user datagram protocol-multicast (UDPM) to data socket 88, and the transmitting unit 38 may be configured to communicate retransmissions via transmission control protocol (TCP) to retransmission socket 89, although other types of protocols may be employed in other embodiments.

It should be further noted that writing an entry 99 into the pool 98, as described above, has the effect of freeing the corresponding buffer 94 (i.e., the buffer 94 identified by the entry 99) for reuse by the receive logic 92. In this regard, each buffer 94 is preferably identified by only one entry 99 in the pool 98. Thus, when the receive logic 92 pulls an entry from the pool 98 in order to write into the buffer 94 identified by the entry 99, as described above, the receive logic 92 is disabled from writing to the same buffer 94 when performing future bulk reads of the socket 88 until the entry 99 is returned to the pool 98 by the either packet delivery logic 134 or the rendering element 153. In this regard, the receive logic 92 is configured to write into a buffer 94 only when the logic 92 is able to pull the corresponding entry 99 from the pool 98. Thus, if a corresponding entry 99 is not in the pool 98, then the receive logic 92 is effectively disabled from writing to the corresponding buffer 94 (i.e., the buffer identified by the foregoing entry 99). As result, by pulling entries 99 from the pool 98 and not returning the entries 99 to the pool until the data stored in the corresponding buffers 94 has been retrieved and used by either the packet delivery logic 134 or the rendering element 153, corruption of valid data in the buffers 94 by the receive logic 92 is prevented.

In addition, it should be noted that not all buffers 94 storing data from a bulk read will have an incomplete sequence stored therein. Indeed, by using techniques, such as those described herein, for increasing the rate at which the receive logic 92 is able to read packets off of the socket 88, buffers 94 storing incomplete packet sequences may be relatively rare. In any event, when the packet delivery logic 134 determines, after pulling an entry 99 from the queue 122, that the buffer 94 identified by the entry 99 is storing a complete packet sequence, the packet delivery logic 134 may simply pass the foregoing entry 99 to the rendering element 153. In response, the rendering element 153 preferably renders the data stored in the buffer 94 identified by the foregoing entry 99. The rendering element 153 also preferably writes the entry 99 to the buffer pointer pool 98 thereby freeing the buffer 94 identified by this entry 99, as described above.

Furthermore, before providing an entry 99 to the rendering element 153, the packet delivery logic 134 may first analyze the packets of the corresponding buffer 94 to determine whether the buffer 94 is storing data packets that were packetized via data from multiple buffers 46 (FIG. 2) via the transmitting unit 38. In some cases, for example, when each buffer 46 stores a different image frame, it may be desirable for each buffer 94 rendered by the rendering element 153 to similarly comprise a different image frame. In such embodiments, the packet delivery logic 134 may be configured to ensure that each entry 99 provided to the rendering element 153 points to a buffer 94 that only stores packets that have been packetized from a single buffer 46.

As an example, if a buffer 94 stores packets packetized via data from two buffers 46, the packet delivery logic 134 may move the packets associated with one of the buffers 46 to a new buffer 94 by pulling a new entry 99 from the buffer pointer pool 98 and storing such packets into the buffer 94 identified by the new entry 99. The entries 99 pointing to each of the foregoing buffers 94 may then be provided to the rendering element 153, which renders the data in the buffers 94 and then returns the entries 99 to the pool 98, as described above. Note that to enable the packet delivery logic 153 to determine whether the packets in a buffer 94 have been packetized from the same buffer 46, the packetization logic 52 (FIG. 2) may be configured to insert into each data packet a value indicative of the total number of packets that were packetized via data from the same buffer 46.

It should be noted that the network inter-face 81, receive logic 92, flow control logic 112, packet delivery logic 134, and rendering element 153 can be implemented in software, hardware, or a combination thereof. In an exemplary embodiment illustrated in FIG. 7, the network protocol layer 86, receive logic 92, flow control logic 112, packet delivery logic 134, and rendering logic 107, along with their associated methodology, are implemented in software and stored in memory 93 of a computer system 207.

Note that the network protocol layer 86, receive logic 92, flow control logic 112, packet delivery logic 134, and rendering logic 107, when implemented in software, can be stored and transported on any computer-readable medium for use by or in connection with an instruction execution system, apparatus, or device, such as a computer-based system, processor-containing system, or other system that can fetch and execute instructions. In the context of this document, a "computer-readable medium" can be any means that can contain, store, communicate, propagate, or transport a program for use by or in connection with the instruction execution system, apparatus, or device. The computer readable-medium can be, for example but not limited to, an electronic, magnetic, optical, electromagnetic, infrared, or semiconductor system, apparatus, device, or propagation medium. Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 7:
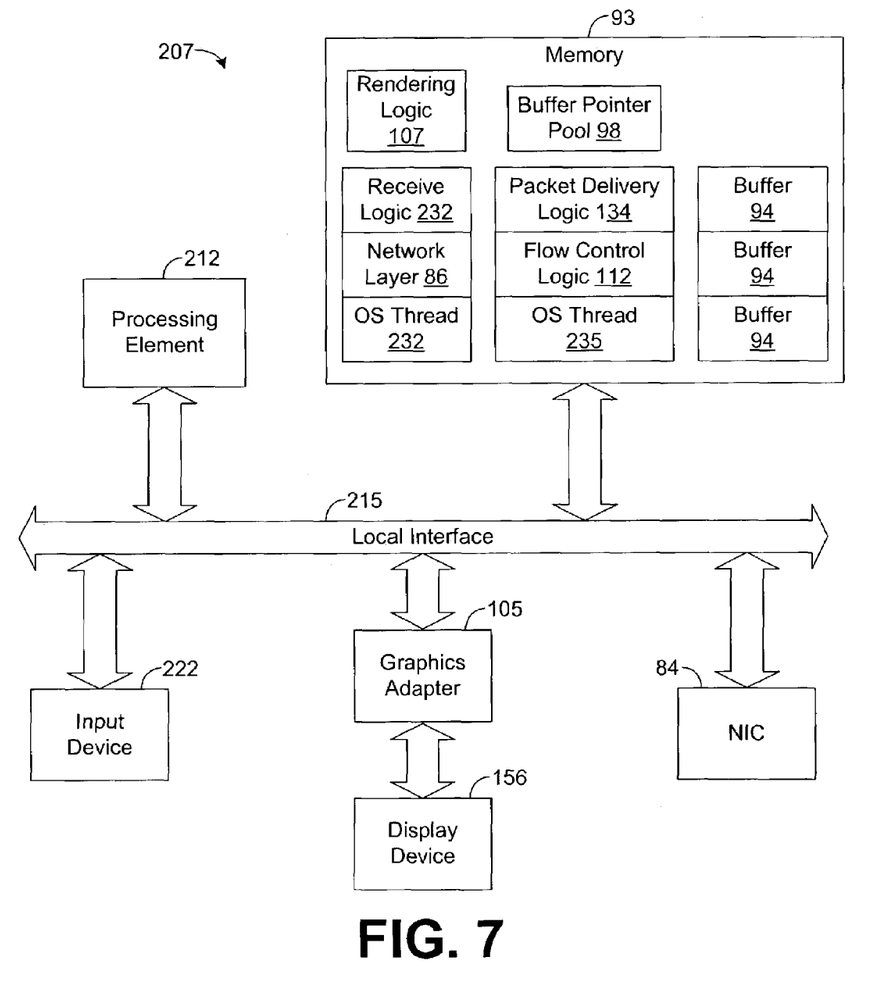
FIG. 7 is block diagram illustrating an exemplary computer system that may be used to implement a buffering system, such as is depicted in FIG. 4.

The exemplary embodiment of the computer system 207 depicted by FIG. 7 comprises at least one conventional processing element 212, such as a digital signal processor (DSP) or a central processing unit (CPU), that communicates to and drives the other elements within the system 207 via a local interface 215, which can include at least one bus. Furthermore, an input device 222, for example, a keyboard or a mouse, can be used to input data from a user of the system 207, and the display device 156, can be used to output data to the user.

As shown by FIG. 7, the network protocol layer 86 and receive logic 92 preferably run on a first operating system (OS) thread 232, and the flow control logic 112 and packet delivery logic 134 preferably run on at least one other OS thread 235 that is a thread of execution separate from the OS thread 232. Note that having the receive logic 92 run on a thread 232 different than the one used to run the flow control logic 112 and the packet delivery logic 134 can help to improve the operational performance of the receiving unit 35. In such an embodiment, the OS thread 232 running the receive logic 92 is not burdened with the tasks performed by the flow control logic 112 and the packet delivery logic 134. Thus, tasks performed by the flow control logic 112 and the packet delivery logic 134 do not substantially usurp the processing resources used to run the receive logic 92. As a result, the receive logic 92 is able to process data packets at a faster rate thereby potentially decreasing the number of retransmission requests generated by the flow control logic 112.

An exemplary use and operation of the communication system 20 and associated methodology are described hereafter.

Initially, the graphics application 44 (FIG. 1) writes a set of graphical data to a buffer 46. The packetization logic 52 retrieves this data and then packetizes the data into a plurality of data packets. For each such data packet, the logic 52 initializes the end of buffer indicator 67 (FIG. 3) to a null value, and sets the sequence indicator 68 based on the sequence that the packets are formed and transmitted from the transmitting unit 38. For example, assume that the packetization logic 52 assigns each packet a sequence indicator 68 that is incremented with respect to the preceding packet formed by the logic 52.

After packetizing the graphical data retrieved from the aforementioned buffer 46, the packetization logic 52 transmits the packets to the network 33 via network interface 55. The packets are preferably transmitted to the network 55 in the same sequence that they were formed such that each transmitted packet generally has a sequence indicator 68 with a higher value as compared to the sequence indicators 68 of the packets transmitted before it. Thus, by analyzing the sequence indicators 68 of the transmitted packets, it is possible to determine the sequence that the packets were transmitted from the transmitting unit 38.

When the transmitted sequence of packets arrives at the receiving unit 35, the packets are received by the socket 88 (FIG. 4). As shown by decision block 312 and blocks 313 and 314 of FIG. 8, the receive logic 92 performs a bulk read of the socket 88 thereby storing at least a portion of the transmission sequence into one of the pre-allocated buffers 94. In this regard, the receive logic 92 pulls a buffer pointer entry 99 from the buffer pointer pool 98 and writes the data read from the socket 88 during the bulk read to the buffer 94 identified by the pointer 102 (FIG. 5) of the pulled entry 99. As shown by block 314, the receive logic 92 preferably continues with the bulk read until the foregoing buffer 94 is full or until all of the data has been read from the socket 88. Note that pulling the entry 99 from the pool 98 has the effect of disabling the receive logic 92 from overwriting the data stored in the foregoing buffer 94 until an entry 99 with the same pointer 102 is later inserted into the buffer pointer pool 98.

Figure 8:
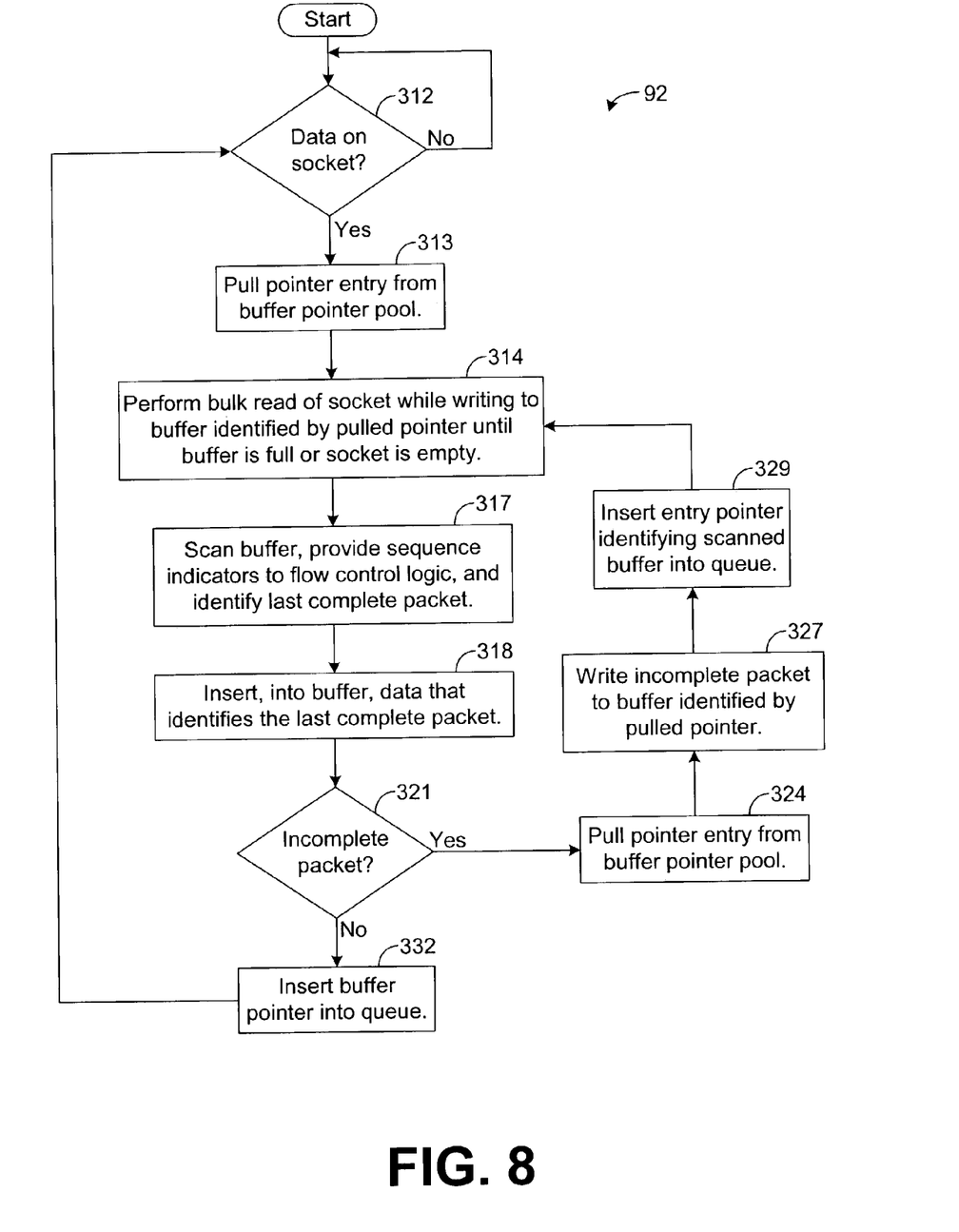
FIG. 8 is a flow chart illustrating an exemplary architecture and functionality of receive logic, such as is depicted in FIG. 4.

After performing the bulk read, the receive logic 92 scans the buffer 94 and identifies each packet within the buffer 94, including the last complete packet stored in the buffer 94, as shown by block 317. While scanning the buffer 94, the receive logic 92 provides, to the flow control logic 112, the sequence indicator 68 of each packet in the buffer 94. As will be described in more detail hereinbelow, the flow control logic 112 determines whether there are any data packets missing from the sequence of packets stored in the buffer 94.

As shown by block 318, the receive logic 92 updates the end of buffer indicator 67 (FIG. 3) of the last complete data packet stored in the buffer 94 such that this indicator 67 points to the first memory address of the buffer 94. Note that, by changing the value of the indicator 67 to a value other than the initialized value (i.e., the null value in the examples described above), the indicator 67 indicates that its data packet is the last complete packet of the buffer 94 or, in other words, that the foregoing packet is not followed in the buffer 94 by a complete data packet.

In decision block 321, the receive logic 92 determines whether the last packet stored in the buffer 94 is an incomplete or partial packet. If so, the receive logic 92 copies the data defining the partial packet into the next buffer 94 to be used for storing the data from the next successive bulk read performed by the receive logic 92. In this regard, in block 324, the receive logic 92 pulls, from the buffer pointer pool 98, an entry 99, referred to hereafter as the "new entry 99." The receive logic 92 then writes the partial packet into the first memory address of the buffer 94, referred to hereafter as the "new buffer 94," identified by the new entry 99, as shown by block 327. Then, the receive logic 92 inserts, into the queue 122, the pointer entry 99 that points to the scanned buffer 94 (i.e., the pointer entry 99 previously described as being pulled from the pool 98 in block 313), as shown by block 329. The receive logic 92 then proceeds to block 314 and performs a bulk read of the socket 88.

Note that the first set of data read during this bulk read corresponds to the remaining portion of the partial packet copied to the new buffer 94 in block 327. This first set of data is preferably written immediately following the partial packet such that the partial packet is transformed into a complete packet via the addition of the first set of data. The remainder of the data read from the socket 88 may be stored in the following memory addresses of the new buffer 94 until the new buffer 94 is full or until the socket 88 is empty.

If the receive logic 92 determines, in decision block 321, that the last packet is not incomplete, then receive logic 92 skips steps 324 and 327. In this regard, as shown by block 332, the receive logic inserts, into the queue 122, the pointer entry 99 that points to the scanned buffer 94 (i.e., the pointer entry 99 previously described as being pulled from the pool 98 in block 312). The receive logic 92 returns to block 312 and repeats the aforedescribed process such that data read from the socket 88, via another bulk read, is stored into a different buffer 94:

As described above, the receive logic 92 transmits, to the flow control logic 112, the sequence indicators 68 of the packets stored in the buffer 94 being scanned via block 317. Based on this information, the flow control logic 112 determines whether there are any data packets missing from the sequence stored in the foregoing buffer 94, as shown by decision blocks 352 and 354 of FIG. 9. If there is a missing sequence of data packets, the flow control logic 112 submits a retransmission request, as shown by block 357.

The foregoing retransmission request is communicated to the transmitting unit 38 (FIG. 1) and identifies the missing sequence of packets. In response, the transmitting unit 38 retransmits the missing sequence of packets. As described above, the retransmitted sequence of data packets preferably arrives at the retransmission socket 89, and the flow control logic 112 stores the retransmitted sequence to a buffer 94 that is temporarily dedicated to this sequence.

Figure 9:
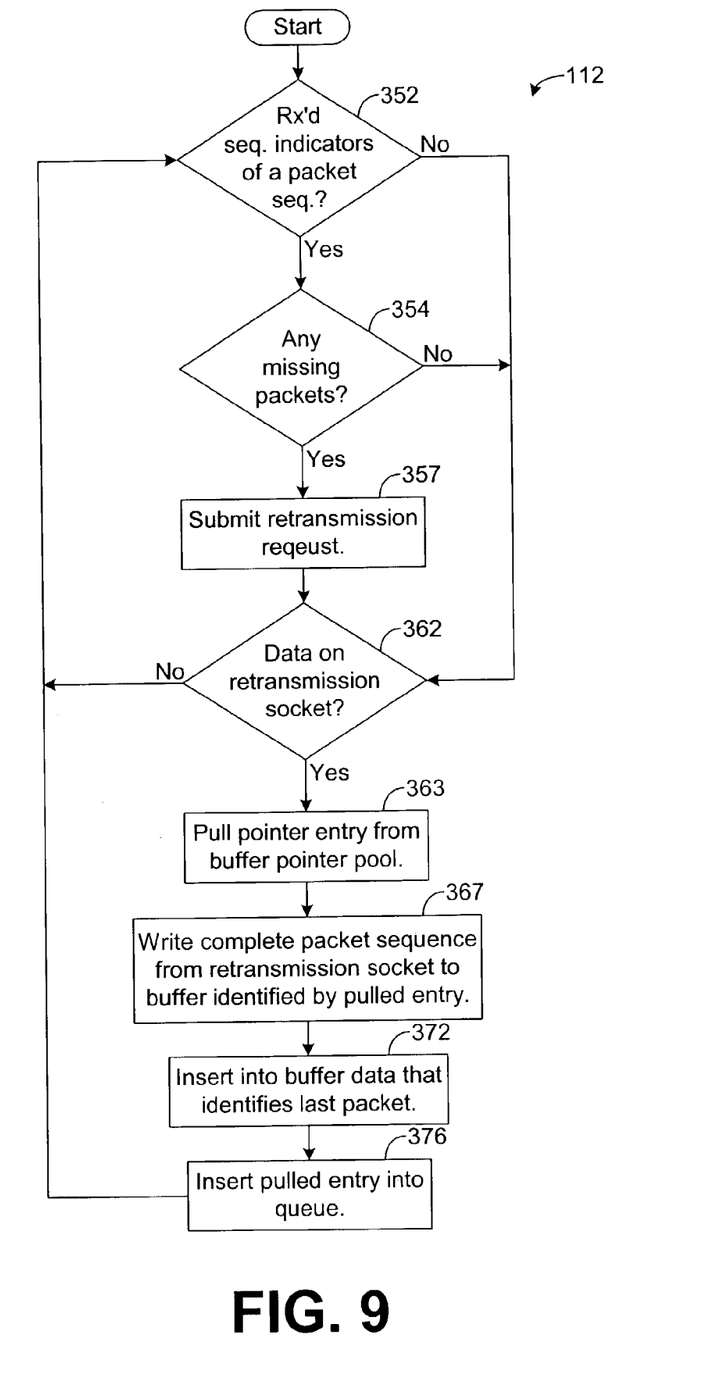
FIG. 9 is a flow chart illustrating an exemplary architecture and functionality of flow control logic, such as is depicted in FIG. 4.

In this regard, upon detection of the retransmission sequence, the flow control logic 112 pulls a buffer pointer entry 99 from the buffer pointer pool 98 and writes the entire retransmitted sequence into the buffer 94 identified by the pulled entry 99, as shown by decision blocks 362, 363 and 367. In block 372, the flow control logic 112 preferably adjusts the end of buffer indicator 67 (FIG. 3) of the last packet of the retransmitted sequence such that the indicator 67 points to the first address of the foregoing buffer 94 thereby indicating that this packet is the last packet of the buffer 94. The flow control logic 112 then inserts, into the queue 122, the pulled entry 99 that identifies the buffer 94 storing the retransmitted sequence, as shown by block 376. Before storing this entry 99 into the queue 122, the flow control logic 112 preferably inserts, into the entry's header 101 (FIG. 5), information indicating that the entry 99 points to the missing packet sequence. In this regard, the information may indicate the range of sequence indicators 68 of the packets stored in the buffer 94 identified by the foregoing entry 99.

Figure 10:
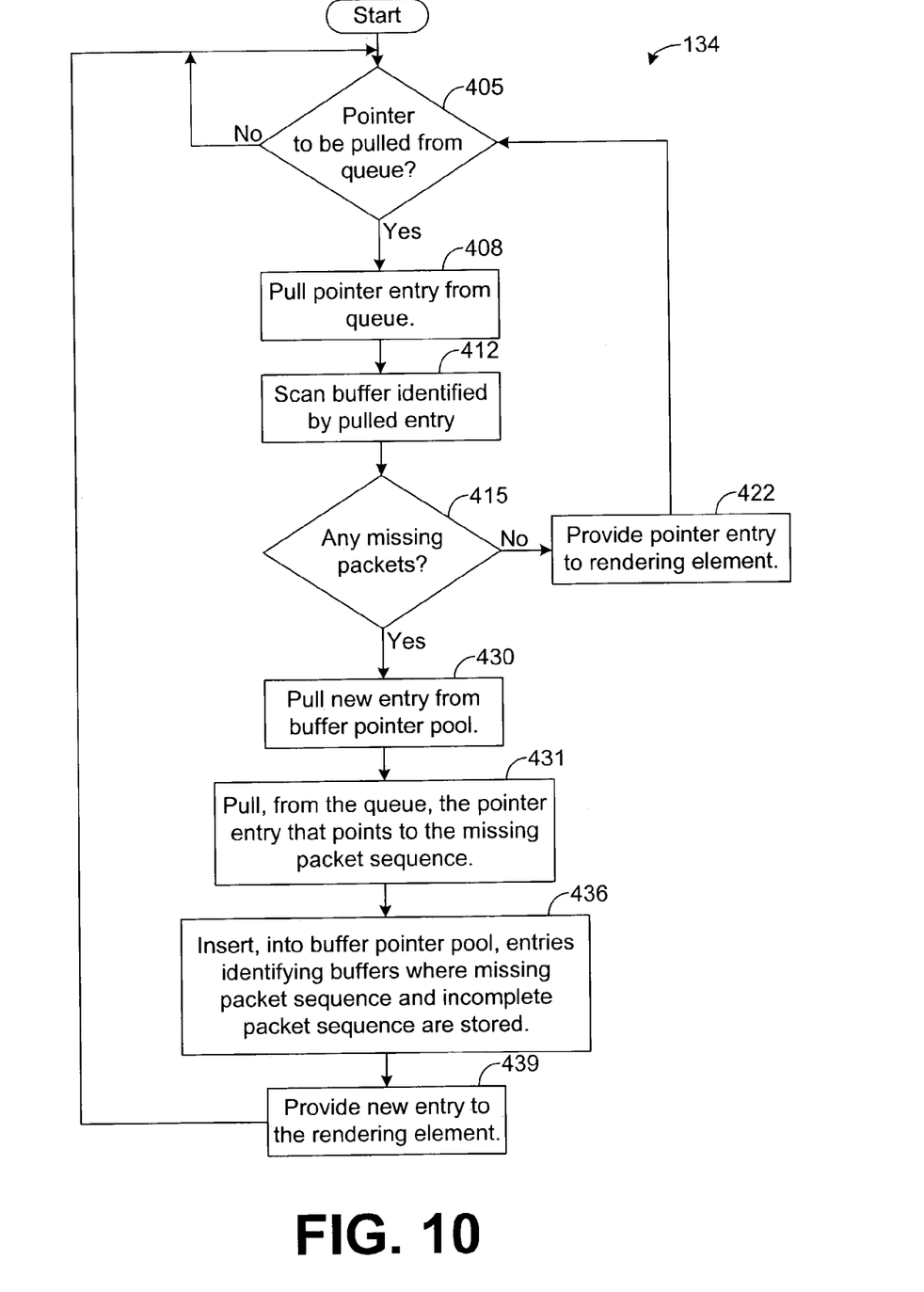
FIG. 10 is a flow chart illustrating an exemplary architecture and functionality of packet delivery logic, such as is depicted in FIG. 4.

As shown by blocks 405 and 408 of FIG. 10, the packet delivery logic 134 checks the queue 122 and pulls an entry 99 from the queue 122 if such an entry 99 is available. The packet delivery logic 134 then scans the buffer 94 identified by the entry 99 and determines whether there are any data packets missing from the packet sequence stored in the scanned buffer 94, as shown by blocks 412 and 415. If there are no missing packets, the packet delivery logic 134, as shown by block 422, provides the entry 99 pulled from the queue 122 via block 408 to the rendering element 153 (FIG. 4). The rendering element 153 then renders the data stored in the buffer 94 identified by the foregoing entry 99. Upon rendering such data, the rendering element 153 returns the entry 99 to the buffer pointer pool 98 thereby freeing the foregoing buffer 94.

However, if the packet delivery logic 134 detects that a sequence of data packets are missing from the foregoing buffer 94 or, in other words, detects that the sequence of data packets in the buffer 94 is incomplete, then the logic 134 pulls an entry 99, referred to as "new entry 99," from the pool 98 in block 430 and constructs a complete packet sequence in block 431. In this regard, the packet delivery logic 134 locates and retrieves the missing packet sequence and combines this missing packet sequence with the incomplete packet sequence to form a complete packet sequence. The logic 134 then stores the complete packet sequence into the buffer 94, referred to as the "new buffer 94," that is identified by the new entry 99.

As an example, assume that the incomplete packet sequence has indicators 68 ranging consecutively from one-hundred (100) to one-hundred-fifty (150) and from three-hundred (300) to four-hundred (400). In such an example, the buffer 94 storing this sequence is missing the packets having sequence indicators 68 ranging from 151 through 299.

In such an example, the flow control logic 112 requests retransmission of the missing packet sequence (i.e., the packets having sequence indicators 68 ranging consecutively from one-hundred-fifty-one (151) to two-hundred-ninety-nine (299)) in block 357 of FIG. 9. The flow control logic 112 also stores the missing packet sequence to one of the buffers 94 in block 367 and inserts, into the queue 122, an entry 99 identifying this buffer 94. Moreover, in implementing block 431 of FIG. 10, the packet delivery logic 134 locates the forgoing entry 99 based on the entry's header 101 and then pulls this entry 99 from the queue 122. The packet delivery logic 134 then retrieves the missing packet sequence from the buffer 94 identified by the foregoing entry 99 and writes these packets, along with the incomplete packet sequence stored in the buffer 94 scanned via block 412, into the new buffer 94. Therefore, the new buffer 94 stores the complete packet sequence (i.e., a packet sequence having each indicator 68 ranging consecutively from one-hundred (100) to four-hundred (400)).

In block 436, the packet delivery logic 134 returns the two entries 99 that identify the buffers 94 storing the missing packet sequence and the incomplete packet sequence. Further, in block 439, the packet delivery logic 134 provides the remaining entry 99 (i.e., the new entry 99 that points to the new buffer 94, which is storing the complete packet sequence) to the rendering element 153. The rendering element 153 then renders the graphical data stored in the new buffer 94 and returns the new entry 99 to buffer pointer pool 98 thereby freeing the new buffer 94. Thus, the packet delivery logic 134 ensures that each entry 99 provided to the rendering element 153 points to a buffer 94 storing a complete packet sequence.

The invention claimed is:

1. A system for buffering data from a network, comprising:
a network socket; and
a receive logic configured to perform a bulk read of the network socket and to store data, comprising a first data packet, from the bulk read into one of a plurality of buffers without determining whether the first data packet is complete before performing a scan of the one buffer, the receive logic further configured to perform the scan of the one buffer and to identify, based on the scan, the first data packet stored in the one buffer being a partial packet, the receive logic further configured to write the first data packet to a second one of the buffers in response to an identification of the first data packet being a partial packet.

2. The system of claim 1, wherein the data from the bulk read defines a plurality of data packets, each of the plurality of data packets having an end of buffer indicator that is indicative of whether a complete data packet follows in the one buffer.

3. The system of claim 1, further comprising a packet delivery logic configured to locate a missing packet sequence in response to a determination, by the packet delivery logic, that the one buffer is storing an incomplete packet sequence, the packet delivery logic further configured to form a complete packet sequence by combining the incomplete packet sequence and the missing packet sequence.

4. The system of claim 1, further comprising a packet delivery logic, wherein the receive logic is configured to run on a first operating system thread, and wherein the packet delivery logic is configured to run on a second operating system thread.

5. The system of claim 1, wherein the receive logic is further configured to identify a packet preceding the first data packet in the one buffer, the logic configured to adjust an end of buffer indicator of the preceding packet.

6. The system of claim 2, wherein the receive logic is configured to adjust the end of buffer indicator to point to a starting address of the one buffer.

7. The system of claim 1, further comprising a buffer pointer pool having a plurality of entries pointing respectively to the buffers, the receive logic configured to pull, from the pool, one of the entries pointing to the one buffer, the receive logic further configured to store the data from the bulk read to the one buffer based on the one entry.

8. The system of claim 7, wherein the receive logic is configured to insert the one entry into a queue, and wherein a packet delivery logic is configured to pull the one entry from the queue and to read the one buffer based on the one entry.

9. The system of claim 1, wherein the data further comprises a second data packet, and wherein the one buffer stores a header portion and a data portion of the second data packet.

* * * * *